US012710266B1

(12) United States Patent
Poutrina et al.

(10) Patent No.: US 12,710,266 B1
(45) Date of Patent: Aug. 18, 2026

(54) META-SURFACE CHARACTERIZATION

(71) Applicant: UES Inc., Dayton, OH (US)

(72) Inventors: Ekaterina Vladislavovna Poutrina, Beavercreek, OH (US); Augustine Michael Urbas, Dayton, OH (US); Joel Dante Leger, Beavercreek, OH (US)

(73) Assignee: Bluehalo, LLC, Huntsville, AL (US)

( * ) Notice: Subject to any disclaimer, the term of this patent is extended or adjusted under 35 U.S.C. 154(b) by 107 days.

(21) Appl. No.: 18/781,153

(22) Filed: Jul. 23, 2024

Related U.S. Application Data

(60) Provisional application No. 63/516,249, filed on Jul. 28, 2023.

(51) Int. Cl.
*G01B 11/24* (2006.01)

(52) U.S. Cl.
CPC ................................ *G01B 11/2441* (2013.01)

(58) Field of Classification Search
USPC .......................................................... 356/601
See application file for complete search history.

(56) References Cited

U.S. PATENT DOCUMENTS

2004/0047039 A1* 3/2004 Wang .................. G02B 5/3058 359/485.05
2011/0156109 A1* 6/2011 Gazit ................ C07K 5/06078 204/450

* cited by examiner

*Primary Examiner* — Md M Rahman
(74) *Attorney, Agent, or Firm* — Goodwin Procter, LLP

(57) ABSTRACT

Phase deviations are determined from measurements of different diffraction orders. Undesired-order focal spots provide an indication of fabrication or design errors, such as, for example, over-etching, under-etching, and incorrect nano-element sizes (which sometimes manifest as “library shift errors”), among others. By calculating deviations in determined phase profiles in comparison to a desired phase profile, which can be done from measurements of various diffraction orders, and correlating the calculated deviations in phase profiles with certain types of fabrication or design errors, the disclosed systems and processes provide accurate, cost-effective, efficient, and scalable approaches for mass production of meta-surfaces.

20 Claims, 17 Drawing Sheets

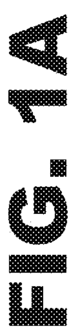
FIG. 1A
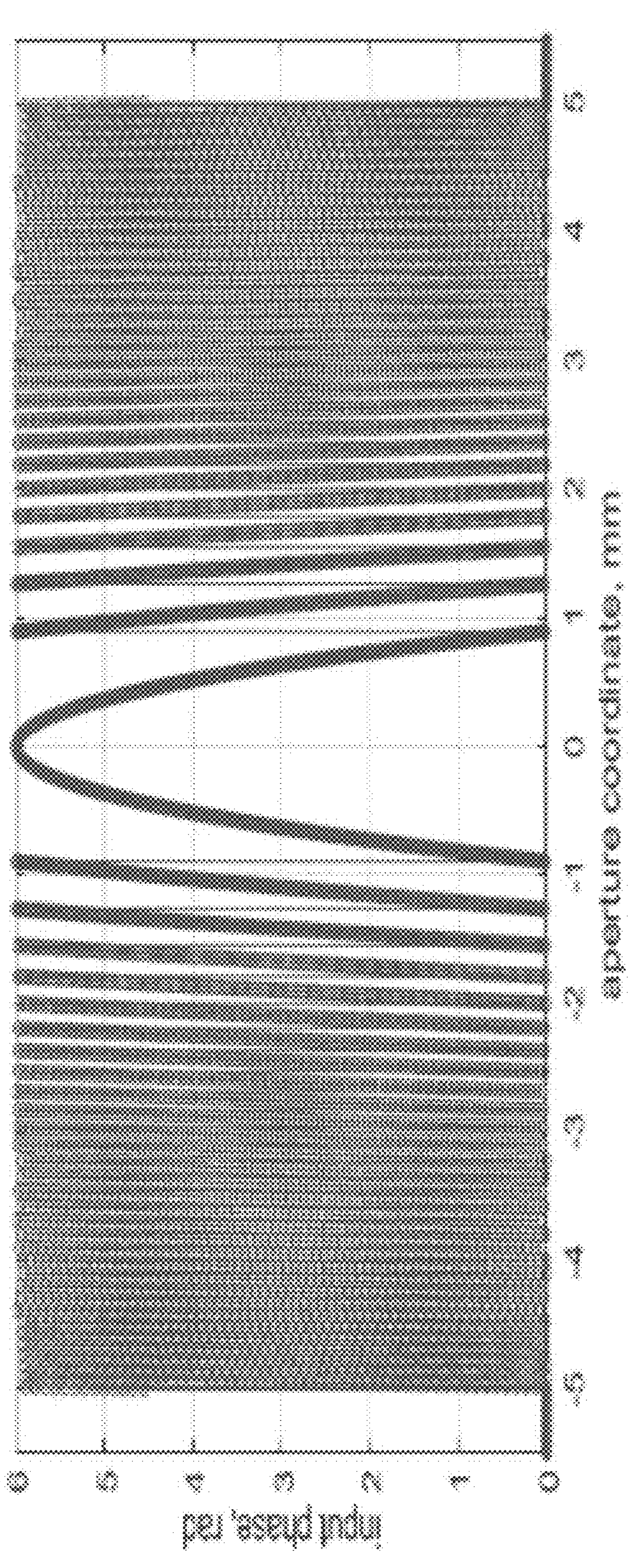
aperture coordinate, mm
input phase, rad
-5
-4
-3
-2
-1
0
1
2
3
4
5
6
5
4
3
2
1
0

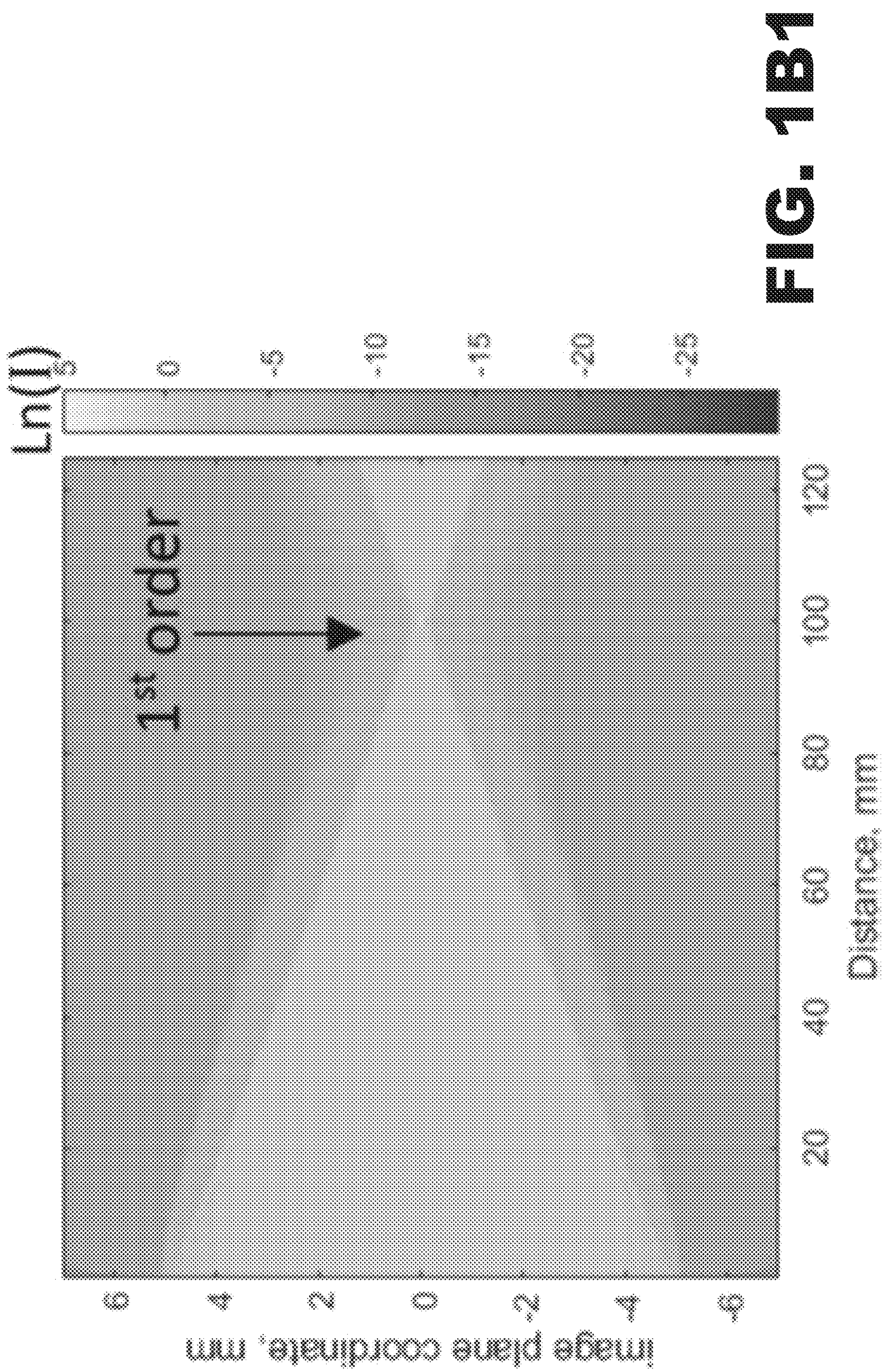
FIG. 1B1

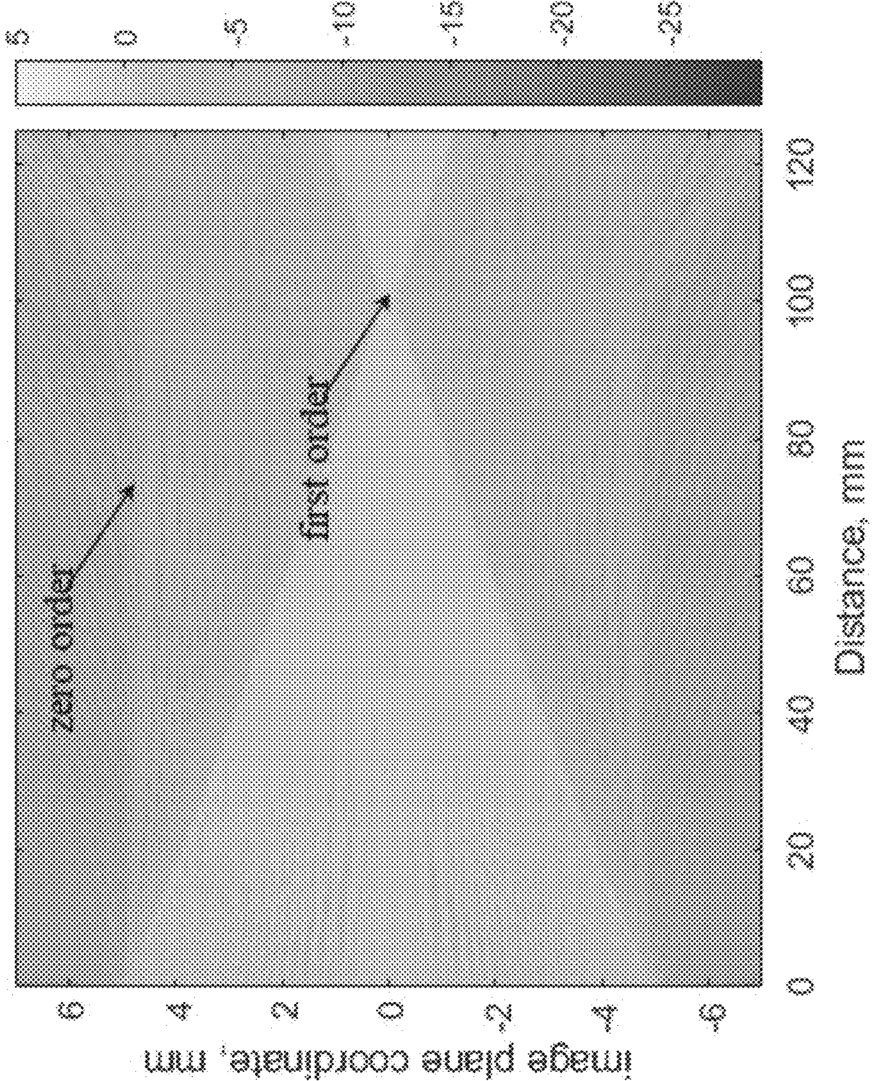
FIG. 1B2

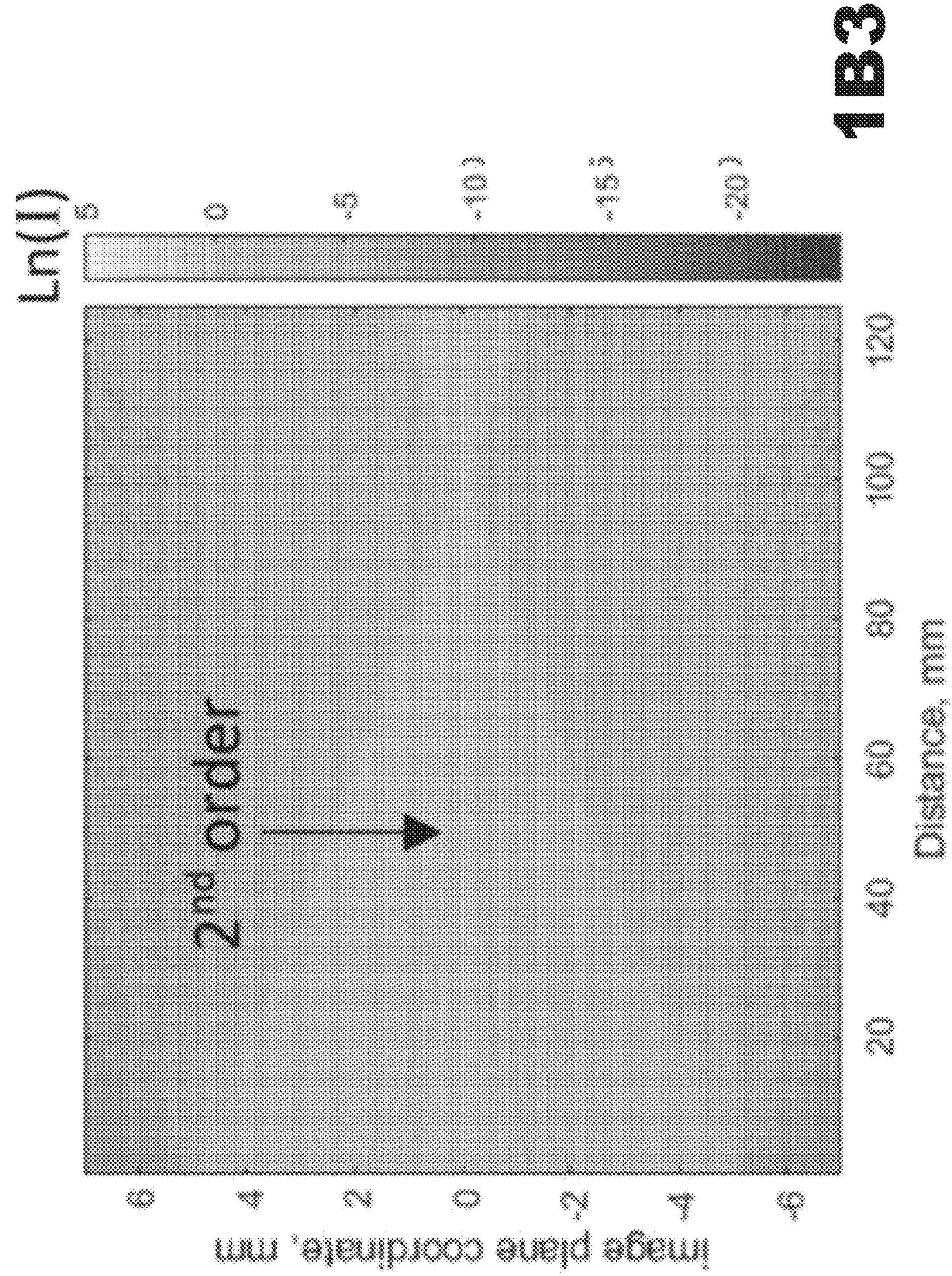
1B3
Ln(I)
5
0
-5
-10
-15
-20
2nd order
120
100
80
60
40
20
Distance, mm
6
4
2
0
-2
-4
-6
image plane coordinate, mm

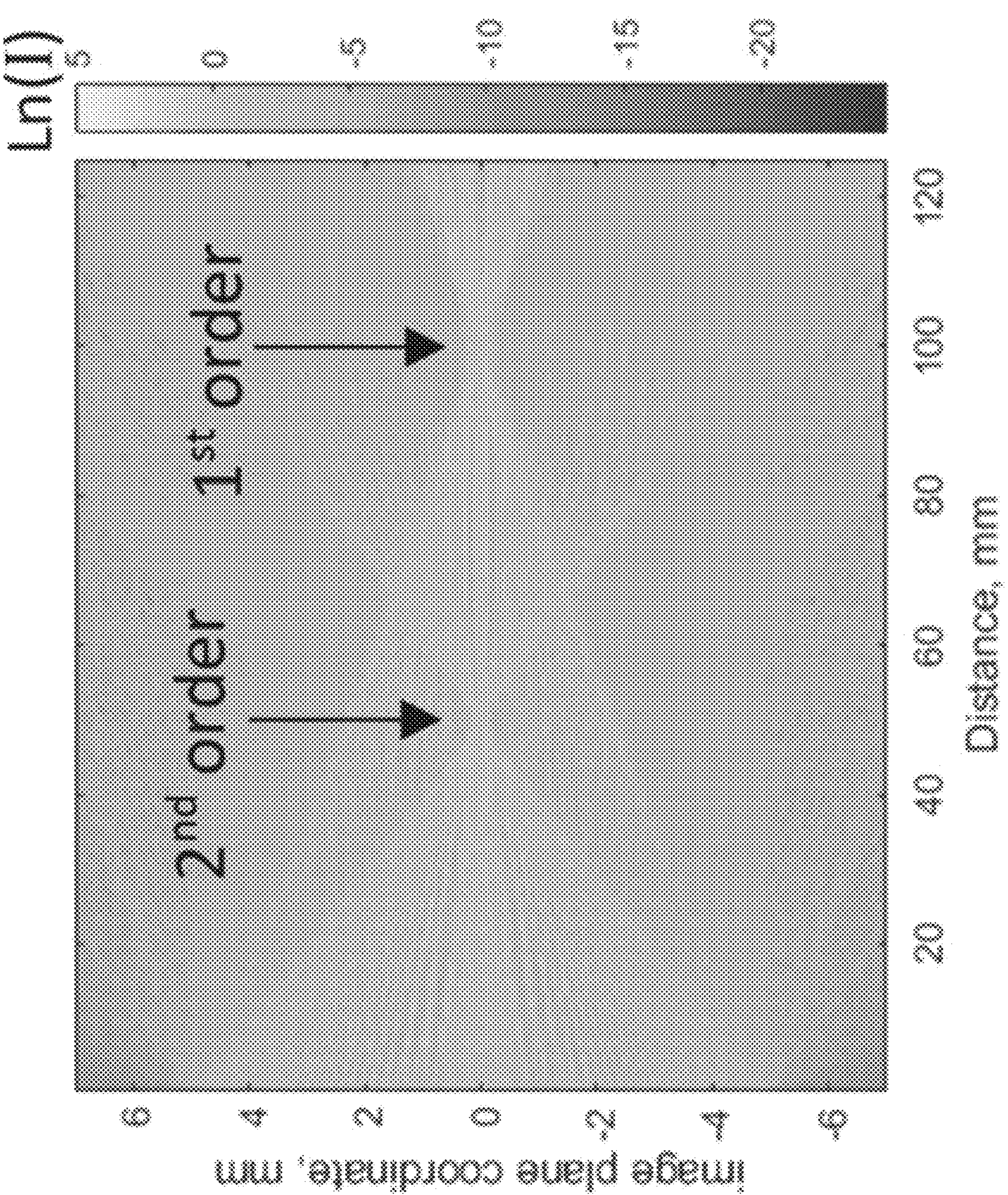
FIG. 1B4

META-SURFACE CHARACTERIZATION

CROSS-REFERENCE TO RELATED APPLICATIONS

This application claims the benefit of U.S. Provisional Application Ser. No. 63/516,249, filed 2023 Jul. 28, having the title "Meta-Surface Characterization," which is incorporated by reference in its entirety as if expressly set forth herein.

STATEMENT REGARDING FEDERALLY SPONSORED RESEARCH OR DEVELOPMENT

This invention was made with government support under Contract Number FA8650-16-D-5408 awarded by the Department of Defense (Department of the Air Force). The government has certain rights in the invention.

BACKGROUND

Field of the Disclosure

The present disclosure relates generally to meta-surfaces and, more particularly, to characterization of meta-lenses and meta-gratings.

Description of Related Art

A meta-surface (or metasurface) is a two-dimensional arrangement of subwavelength-sized structures or nanoelements that can manipulate the properties of light or other types of waves. These structures are typically patterned on a surface, and they are designed to have precise control over the phase, amplitude, and polarization of incoming waves. A meta-lens (also known as a meta-surface lens) and a meta-grating (also known as a meta-surface grating) are subclasses of meta-surfaces. These meta-surfaces use nanoscale elements (also known as meta-atoms or meta-elements) to manipulate light. Because of the size and the sheer numbers of these nanoscale elements on the meta-surface area, conventional techniques for detecting errors during fabrication of meta-lenses are impractical for mass production.

SUMMARY

The present disclosure provides systems and processes that determine deviations in phase profiles of meta-surfaces, specifically for types of meta-surfaces that are designed to direct light into distinct diffraction orders during normal operation. Prominent examples of such meta-surfaces include meta-lenses and meta-gratings. For some embodiments, phase deviations are determined from measurements of different diffraction orders, which can be done using inexpensive detectors (e.g., photodiodes). In the case of meta-lenses, deviations in phase profiles cause an emergence of undesired-order focal spots, which reduces focusing efficiency of desired-order focal spots. By way of example, if a first-order focal spot is desired, then deviation in phase profiles will cause an emergence of one or more non-first-order focal spots (e.g., zero order, second order, third order, fourth order, etc.). These undesired-order focal spots provide an indication of fabrication or design errors, such as, for example, over-etching, under-etching, and incorrect nanoelement sizes (which sometimes manifest as "library shift errors"), among others. By calculating phase errors (or by calculating deviations in determined phase profiles in comparison to a desired phase profile), which can be done from measurements of various diffraction orders, and correlating the calculated deviations in phase profiles with certain types of fabrication or design errors, the disclosed systems and processes provide accurate, cost-effective, efficient, and scalable approaches for mass production of meta-surfaces (such as meta-lenses, meta-gratings, etc.).

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1A is a graph showing an undistorted phase profile in a selected cross-sectional slice for one embodiment of a meta-lens with input phase (in radians (rad)) plotted as a function of aperture coordinate (in millimeters (mm)).

FIG. 1B1 is a graph showing light beam propagation and a first-order focal spot (shown as a region of enhanced intensity at the first-order focal position) for an embodiment of a meta-lens with a ten-millimeter (10 mm) diameter, a 100 mm focal length (f), and substantially no (±0%) phase distortion, with beam intensity plotted as a function of propagation distance (shown in mm) along a focal axis (perpendicular to the planar surface of the meta-lens).

FIG. 1B2 is a graph showing emergence of a zero-order transmission and a second-order focal spot, in addition to the first-order focal spot, for an embodiment of a meta-lens with a 10 mm diameter, a 100 mm focal length, and a phase distortion caused by a negative ten percent (−10%) linear phase error, with beam intensity plotted as a function of distance (mm) along the focal axis.

FIG. 1B3 is a graph showing the presence of both a second-order focal spot and a first-order focal spot in the case of beam propagation through an embodiment of a meta-lens with a 10 mm diameter, a 100 mm focal length, and a phase distortion caused by a positive twenty-five percent (+25%) linear phase error, with beam intensity plotted as a function of distance (mm) along the focal axis.

FIG. 1B4 is a graph showing the presence of both a second-order focal spot and a first-order focal spot in the case of beam propagation through an embodiment of a meta-lens with a 10 mm diameter, a 100 mm focal length, and a phase distortion caused by a positive fifty percent (+50%) linear phase error, with beam intensity plotted as a function of distance (mm) along the focal axis.

Figure 2A:
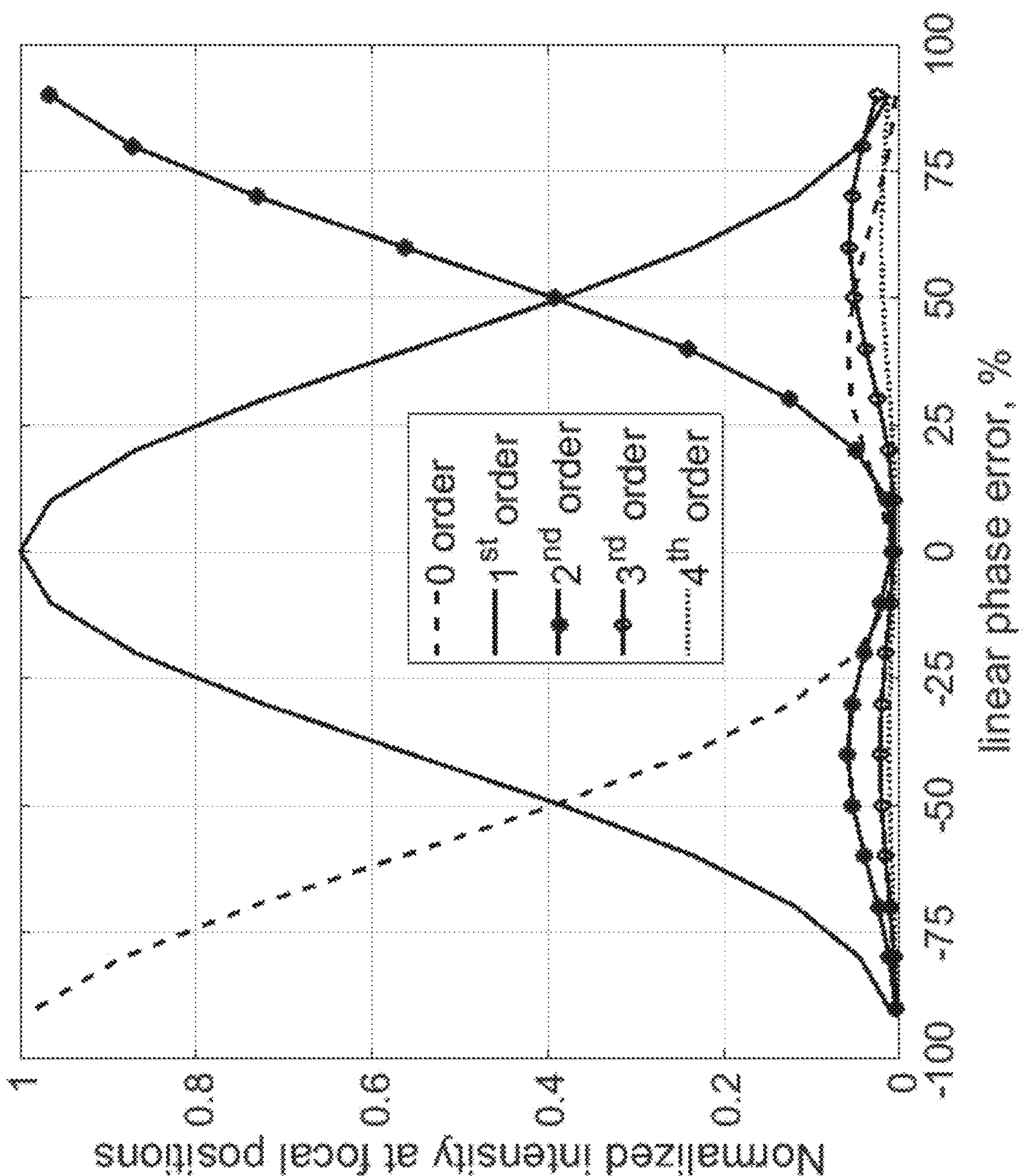
FIG. 2A is a graph showing normalized intensity of different diffraction orders plotted as a function of percent linear phase error (%).
Figure 2B:
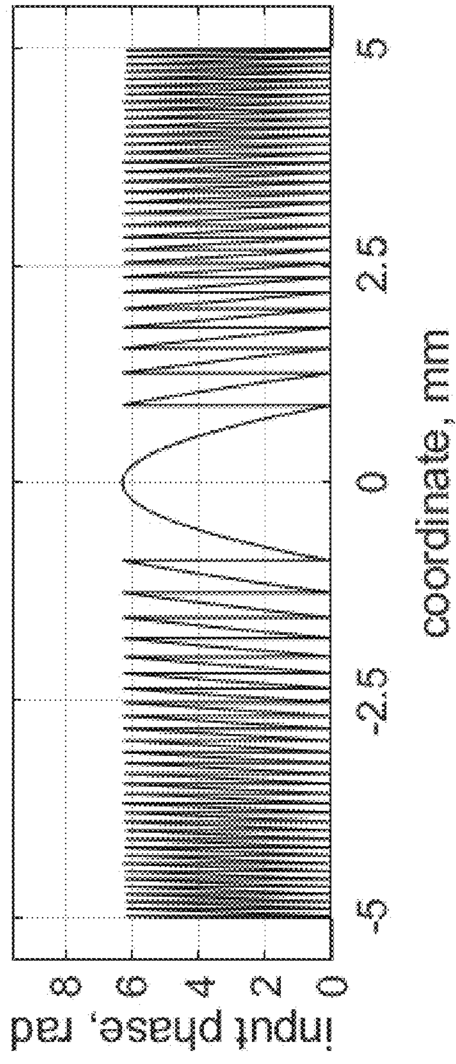
FIG. 2B is a graph showing a phase profile in a selected cross-sectional slice for one embodiment of an undistorted meta-lens (meaning, a zero percent (±0%) phase error from 2π), with input phase (rad) plotted as a function of aperture coordinate (mm).

linear phase error as compared to FIG. 2B, with input phase (rad) plotted as a function of aperture coordinate (mm).

Figure 2C:
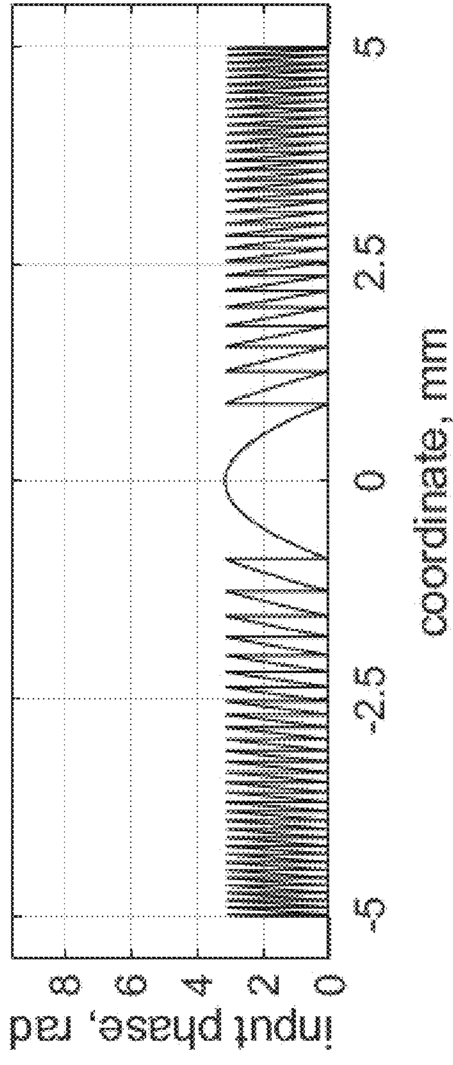
FIG. 2C is a graph showing a phase profile for the meta-lens of FIG. 2B having a negative fifty percent (−50%)
Figure 2D:
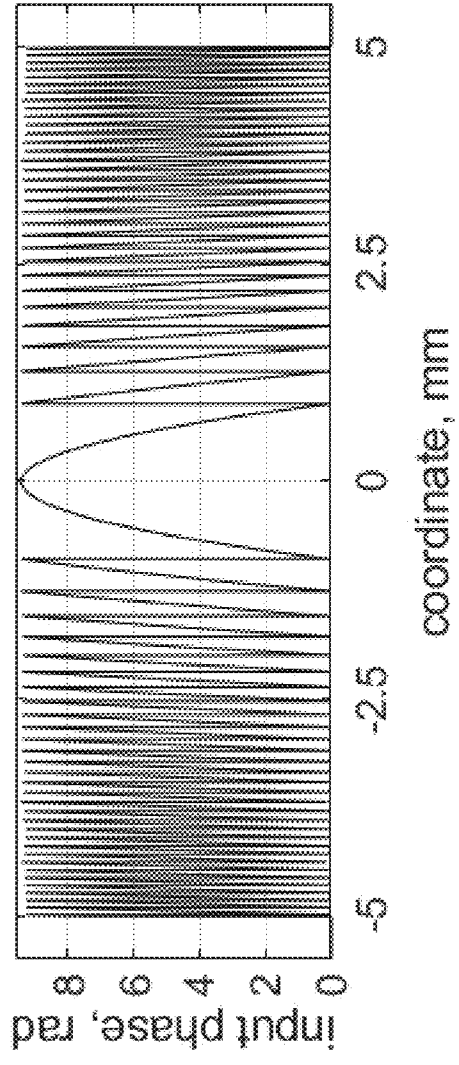

FIG. 2D is a graph showing a phase profile for the meta-lens of FIG. 2B having a positive fifty percent (+50%) linear phase error as compared to FIG. 2B, with input phase (rad) plotted as a function of aperture coordinate (mm).

Figure 3A:
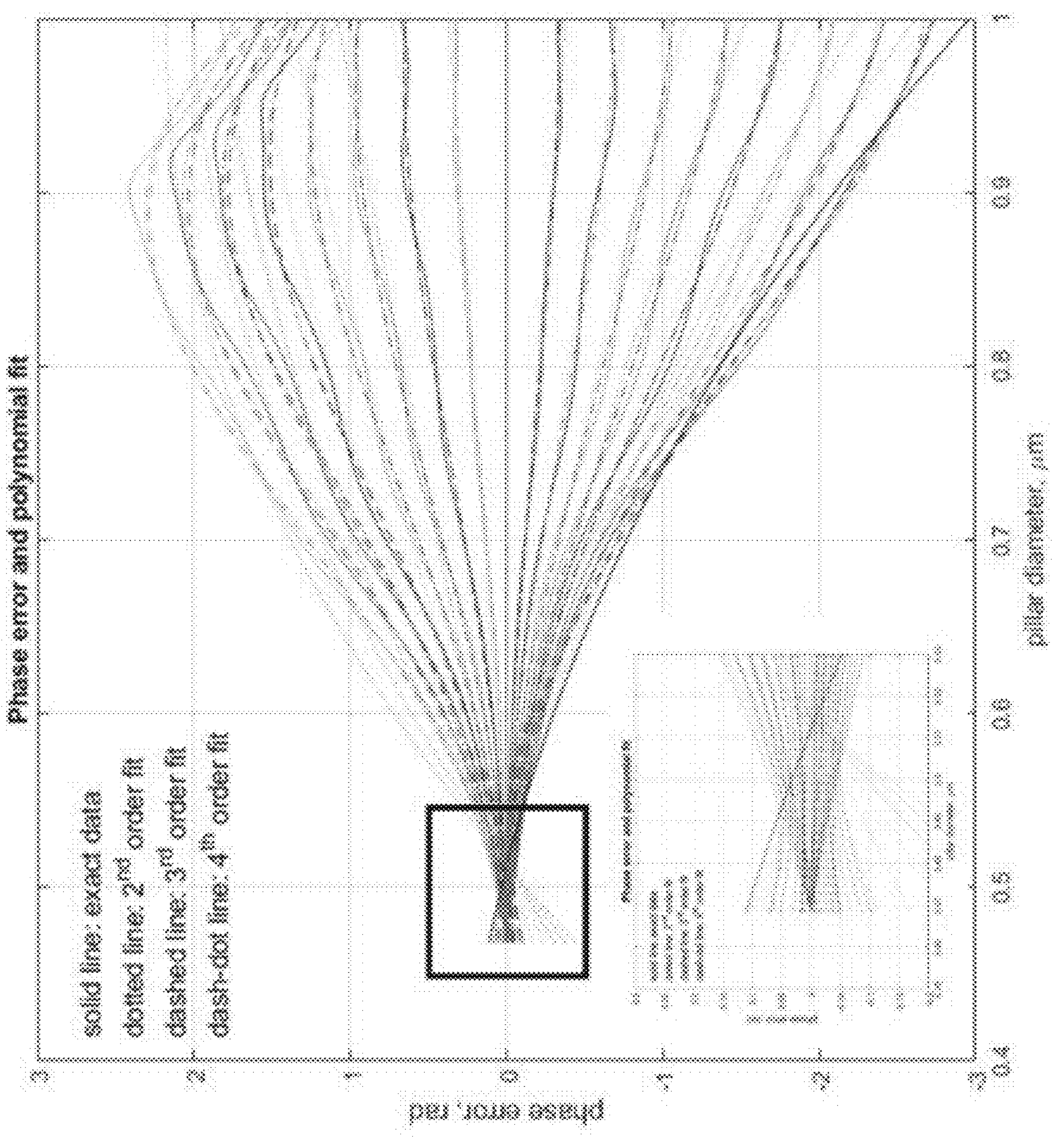

FIG. 3A is a graph showing various polynomial fits (along with an enlarged view of a portion of the graph as an inset), with phase error (rad) resulting from an up to 16% library shift plotted as a function of pillar diameter (in micrometers (μm)) for one embodiment of a library of nanoelements used in a meta-lens construction (with the library representing a set of pillars of a certain height and varying diameter, arranged periodically with a certain pitch; specifically, for FIG. 3A, the pillar height being 3.5 μm (H=3.5 μm) and the pitch being 1.5 μm (S=1.5 μm)).

Figure 3B:
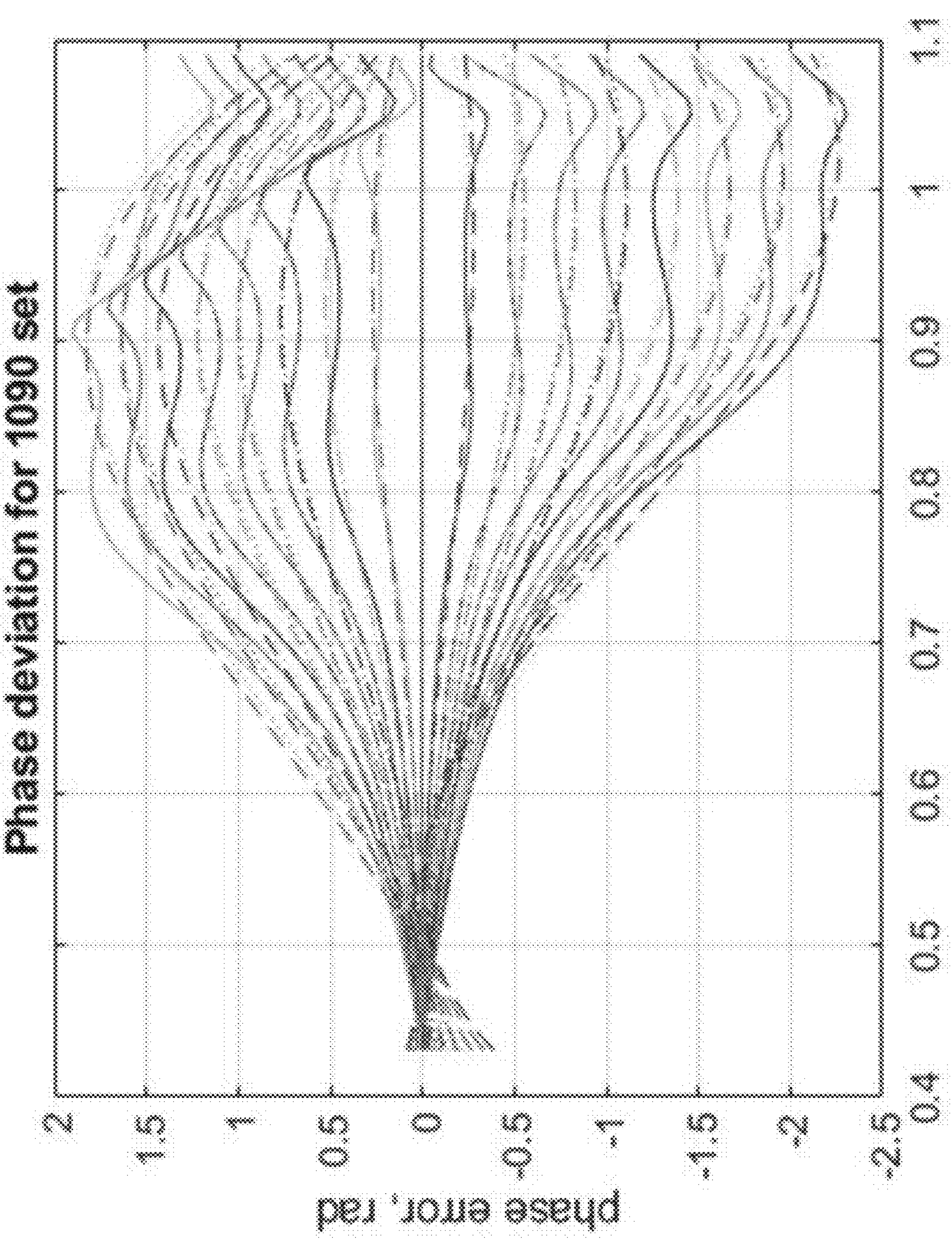

FIG. 3B is a graph showing various polynomial fits, with phase error (rad) resulting from an up to 16% library shift plotted as a function of pillar diameter (μm) for another embodiment of a library of nanoelement of a meta-lens (H=3.0 μm; S=1.5 μm).

Figure 4A:
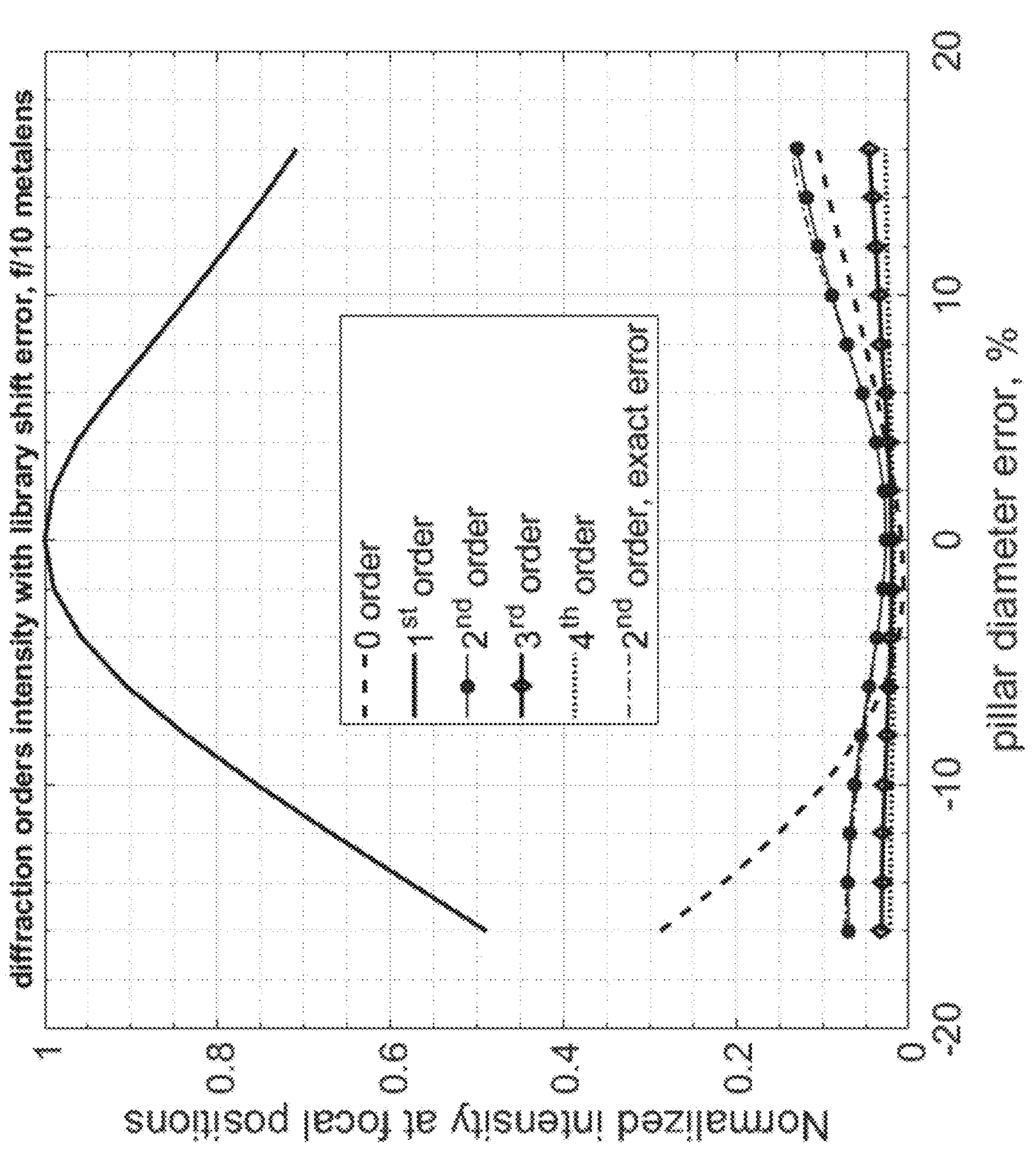

FIG. 4A is a graph showing an impact of a library shift error (caused by a shift of pillar diameters from designated pillar values) on the intensity of various diffraction orders, in accordance with one embodiment of the invention, with normalized intensities at corresponding focal positions (unitless) plotted as a function of pillar diameter error (%).

Figure 4B:
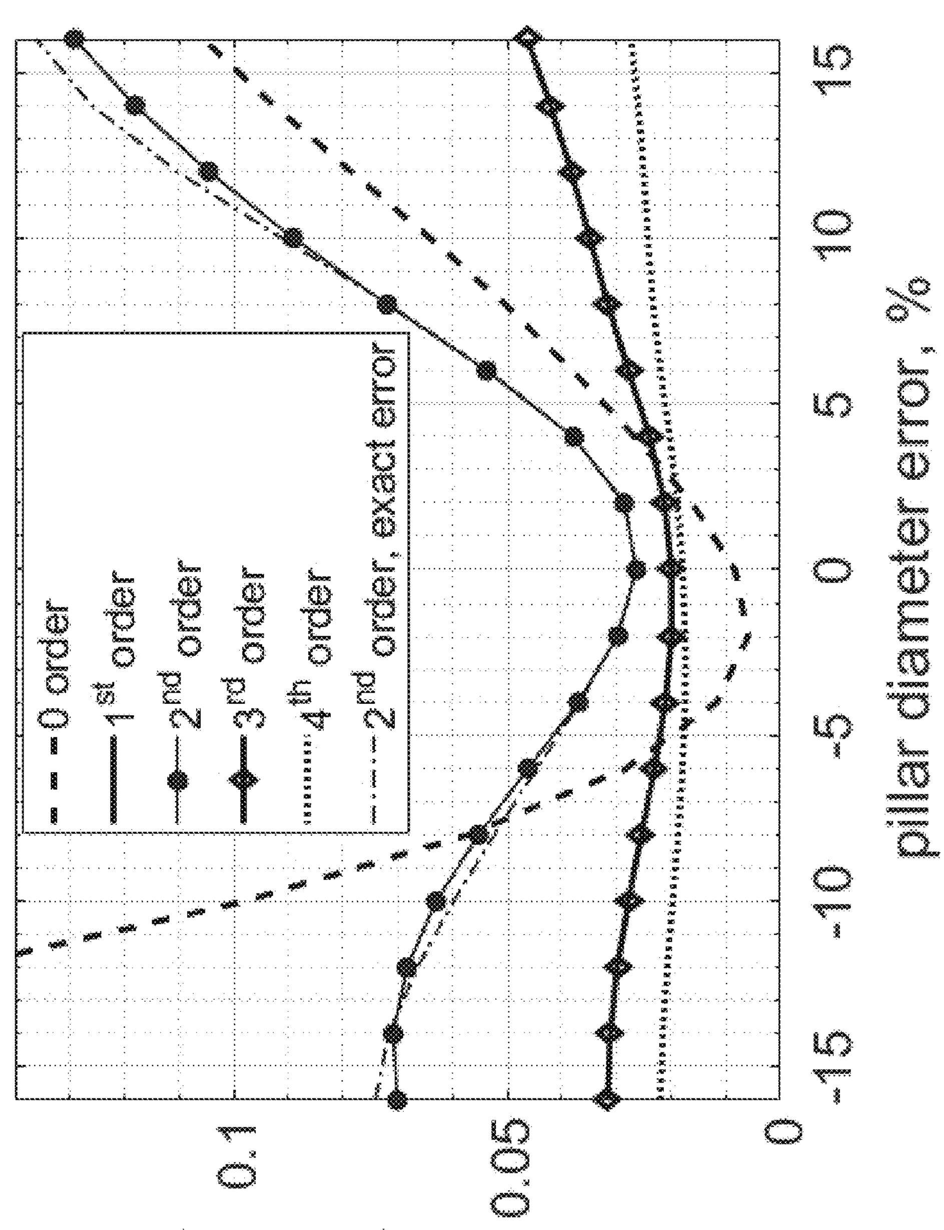

FIG. 4B is a graph showing an enlarged portion of FIG. 4A, showing more clearly the higher orders.

Figure 4C:
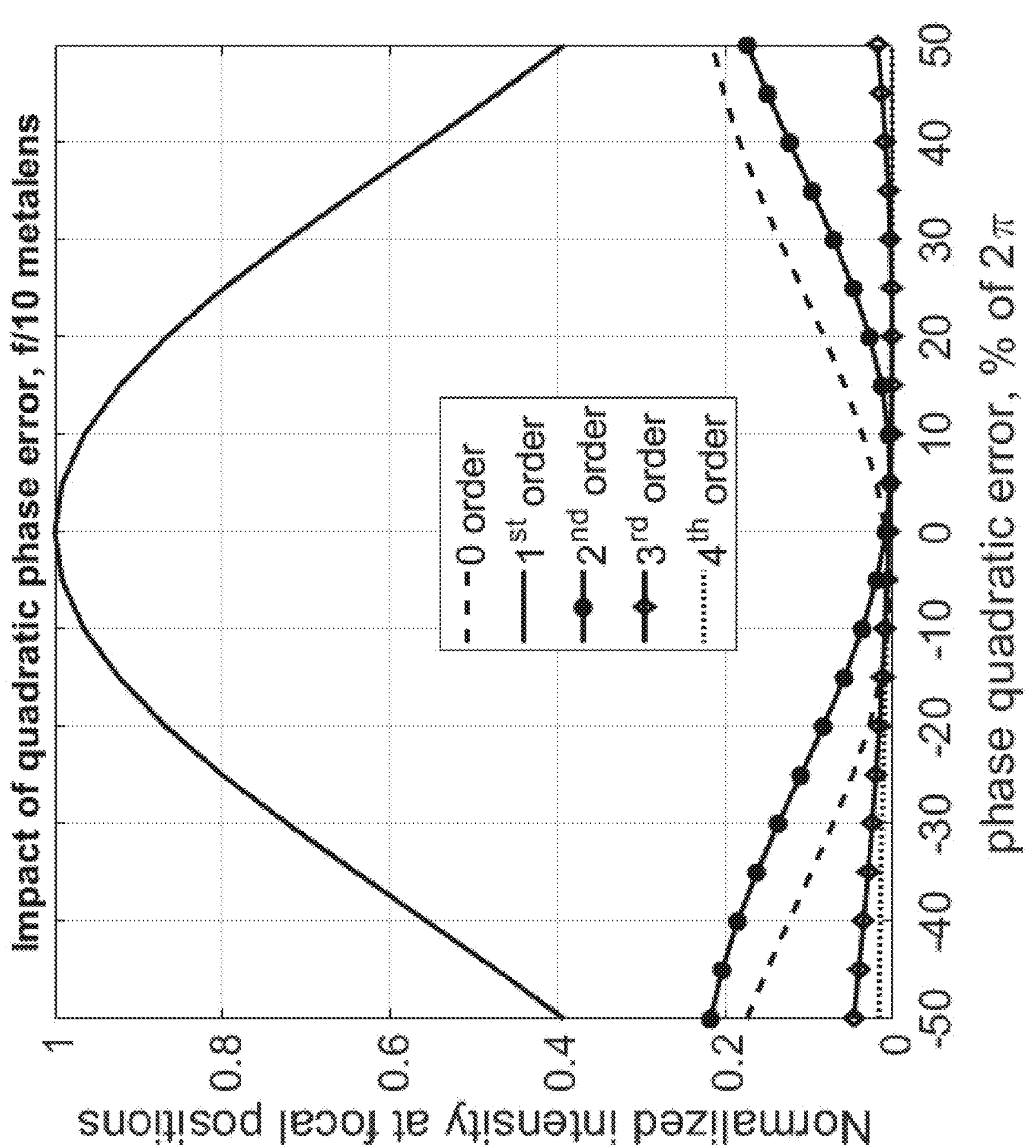

FIG. 4C is a graph showing an impact of a second-order (or quadratic) phase error on the intensity of various diffraction orders, in accordance with one embodiment of the invention, with normalized intensities at corresponding focal positions (unitless) plotted as a function of quadratic phase error (%).

Figure 4D:
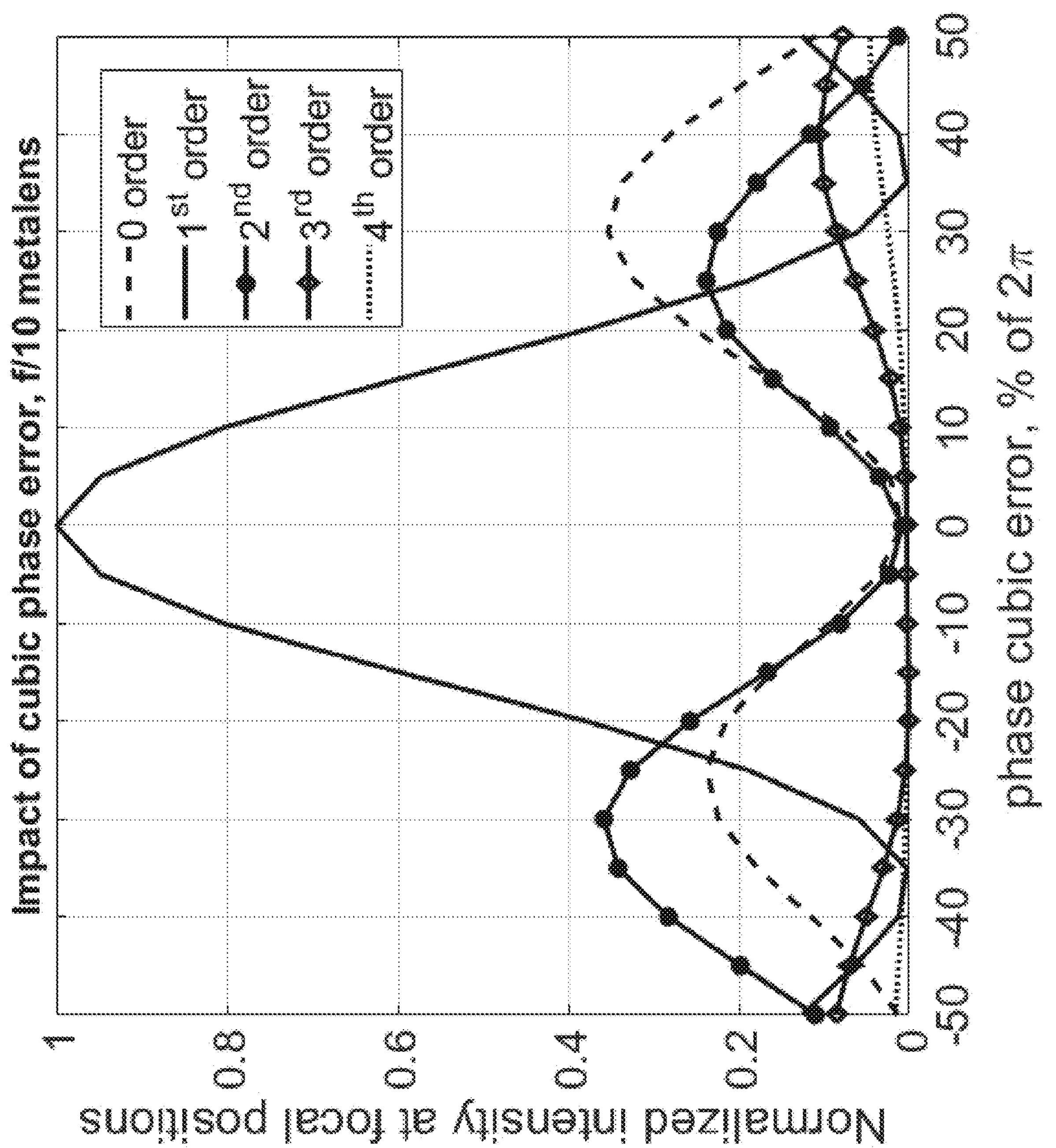

FIG. 4D is a graph showing an impact of a third-order (or cubic) phase error on the intensity of various diffraction orders, in accordance with one embodiment of the invention, with normalized intensities at corresponding focal positions (unitless) plotted as a function of cubic phase error (%).

Figure 5:
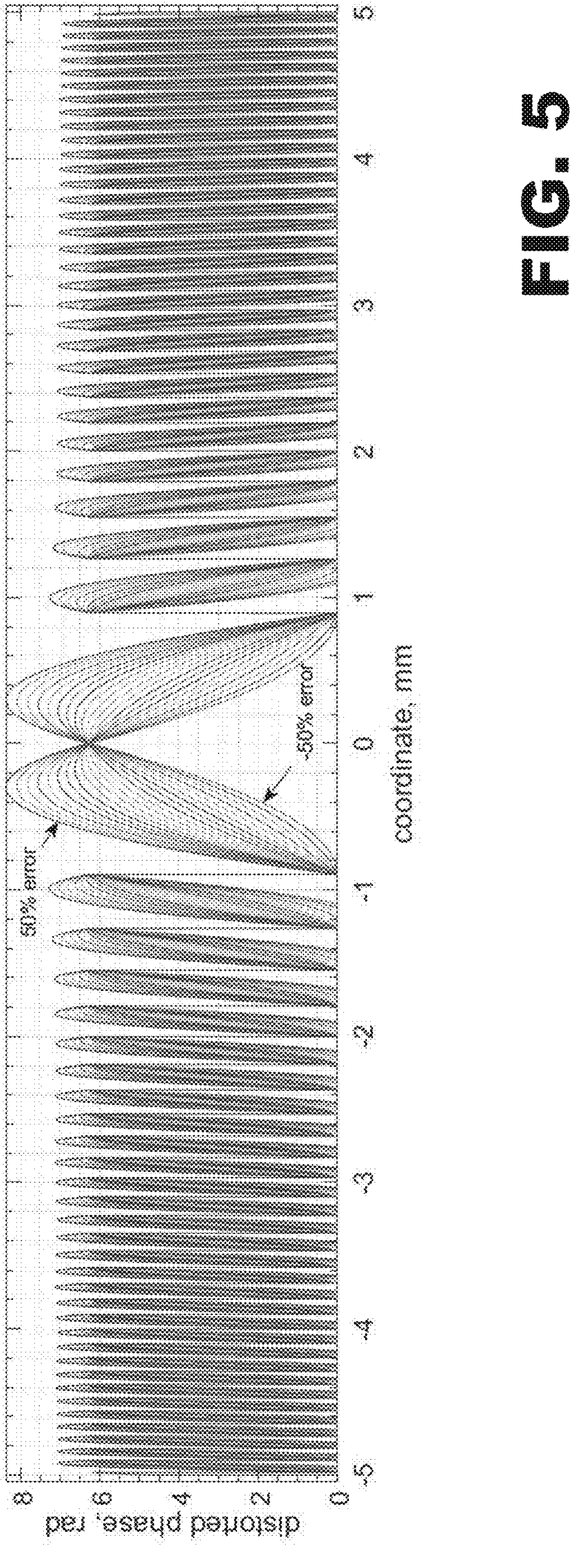

FIG. 5 is a graph showing an impact of quadratic phase errors on a phase profile of one embodiment of a meta-lens, with the phase profile incorporating various amounts of the quadratic phase errors (rad) plotted as a function of aperture coordinate (mm).

Figure 6:
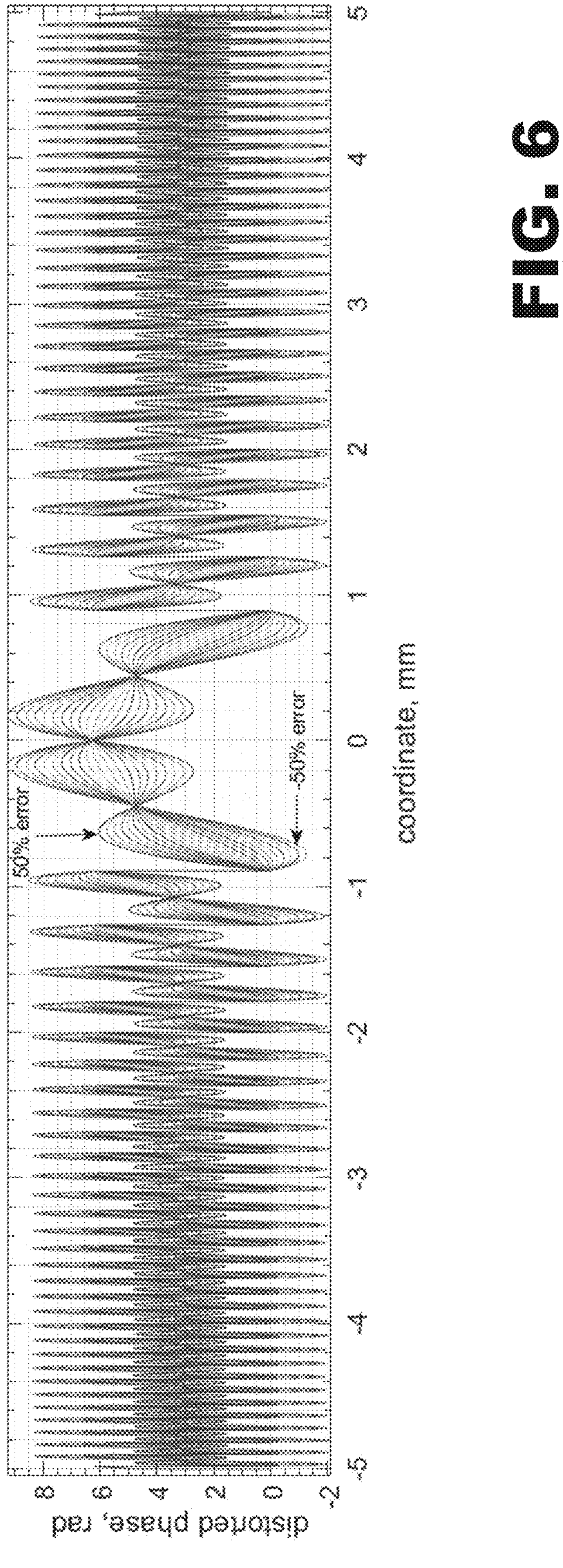

FIG. 6 is a graph showing an impact of cubic phase errors on a phase profile of one embodiment of a meta-lens, with the phase profile incorporating various amounts of cubic phase errors (rad) plotted as a function of aperture coordinate (mm).

DETAILED DESCRIPTION OF THE EMBODIMENTS

A meta-surface (also spelled as metasurface) is a two-dimensional arrangement of subwavelength-sized structures or nanoelements that can manipulate properties of light or other types of waves. These structures are typically patterned on a flat surface and are designed to have precise control over phase, amplitude, and polarization of incoming waves. Meta-surfaces exhibit extraordinary wavefront control capabilities through careful design of the geometry, size, and orientation of nanoelements. Unlike standard optical elements that are typically limited to axisymmetric structures and phase profiles, meta-surfaces can generate arbitrarily complex wavefronts by manipulating the phase and amplitude at each point. Subclasses of meta-surfaces that are designed to direct light into distinct diffraction orders during normal operation include meta-lenses and meta-gratings.

A meta-lens (also designated herein as metalens or meta-surface lens) uses nanoscale elements to manipulate light. Thus, unlike traditional lenses that rely on refractive properties, meta-lenses use sub-wavelength structures that are patterned on flat surfaces to control phase characteristics, amplitude characteristics, and polarization characteristics of light. Often, the nanoscale elements (or nanoelements or nanostructures) are nano-rods or nano-discs (also designated herein as pillars) of varying sizes that are arranged in a periodic manner, thereby allowing the nanostructures to manipulate light properties at each point on the meta-lens. Such a point-by-point manipulation permits precise control over the profile of light as it passes through the meta-lens. Because of their properties, meta-lenses find application in imaging systems, augmented reality displays, microscopy, photolithography, and a host of other optical applications.

Because nanostructures in meta-surfaces are smaller than the wavelengths of light that they are designed to manipulate, a single meta-lens can have millions (if not billions) of nanoelements. These millions-to-billions of nanoelements are arranged with precision to avoid optical distortions or other undesired optical effects. In other words, there are ongoing efforts to minimize or eliminate manufacturing errors during the fabrication of meta-lenses.

Currently, conventional techniques for detecting fabrication errors include scanning electron microscopy (SEM), local-area interferometry, or use of wavefront sensors. However, all of these conventional methods are both expensive and time-consuming, thereby rendering them largely impractical for mass production. Consequently, there is a need in the art for robust and scalable error detection that can be applied to commercial mass production of meta-lenses.

To address such a need in the art, this disclosure teaches systems and processes that determine deviations in phase profiles of meta-surfaces, specifically for types of meta-surfaces that are designed to direct light into distinct diffraction orders during normal operation. Prominent examples of such meta-surfaces include meta-lenses and meta-gratings. For some embodiments, phase deviations are determined from measurements of different diffraction orders, which can be done using inexpensive detectors (e.g., photodiodes). In the case of meta-lenses, deviations in phase profiles cause an emergence of undesired-order focal spots, which reduces focusing efficiency of desired-order focal spots. By way of example, if a first-order focal spot is desired, then deviations in phase profiles will cause an emergence of one or more non-first-order focal spots (e.g., zero order, second order, third order, fourth order, etc.). These undesired-order focal spots provide an indication of fabrication or design errors, such as, for example, over-etching, under-etching, and incorrect nanoelement sizes (which sometimes manifest as "library shift errors"), among others. By calculating phase errors (or by calculating deviations in determined phase profiles in comparison to a desired phase profile), which can be done from measurements of various diffraction orders, and correlating the calculated deviations in phase profiles with certain types of fabrication or design errors, the disclosed systems and processes provide accurate, cost-effective, efficient, and scalable approaches for mass production of meta-surfaces (such as meta-lenses, meta-gratings, etc.).

Having provided a broad technical solution to a technical problem, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

FIG. 1A is a graph showing an undistorted phase profile in a selected cross-sectional slice for one embodiment of a meta-lens having a ten-millimeter (10 mm) diameter and a focal length (f) of 100 mm. Such a meta-lens has the f-number (the ratio of the focal length to diameter) of 10, which is designated as f/10. The input phase (in radians (rad)) is plotted as a function of aperture coordinate (in millimeters (mm)). In the embodiment of FIG. 1A, the meta-lens has rotational symmetry and, thus, the phase profile exhibits symmetry about a center of the aperture coordinate (labeled as 0 mm (horizontal axis)), with an increasing slope of the input phase radially outward (in f/10 mm units) from 0. In the absence of any phase distortion, the first-order focal position, which is the designated order for lens operation, resides at a distance of 100 mm from the image plane of the meta-lens. As shown in the graph of FIG. 1B1, a first-order focal spot is present at this first-order focal position. A normalized first-order intensity is measurable at the first-order focal spot or within a first diffraction order in an angular spectrum.

When phase deviations from FIG. 1A are present, such as linear phase errors, corresponding phase distortions emerge along the optical path. Specifically, the linear phase error shows a uniform decrease or increase of phase range compared to the value of $2\pi$ (meaning, $2\pi$=100% and any deviation from $2\pi$ is represented as a percentage). For reference, FIG. 1B1 shows a first-order focal spot (shown as a region of enhanced intensity at the first-order focal position) when there is substantially no phase distortion (meaning, ±0% phase error).

Comparatively, with a negative ten percent (−10%) linear phase error (as shown in FIG. 1B2), both a second-order focal point (shown as a region of enhanced intensity at the second-order focal position) and a zero-order transmission emerge. The zero-order transmission represents under-etching of the nanostructures on the meta-lens.

As shown in FIG. 1B3, with a +25% linear phase error, a second-order focal spot emerges and, as the linear phase error grows beyond +25%, the second-order focal point increases in intensity. The emergence and growth of light intensity at the second-order focal position represents over-etching of the nanostructures on the meta-lens.

FIG. 1B4 shows that a +50% linear phase error results in a more pronounced second-order focal position, again representing over-etching.

For clarity, FIGS. 1B1 through 1B4 show a Fourier analysis of phase distortions in the 10 mm diameter f/10 meta-lens with a grayscale representing natural log of the light intensity at the wavelength ($\lambda$) under study.

As shown in FIGS. 1A through 1B4 (collectively designated as FIG. 1), certain fabrication errors or design errors in larger-area meta-lenses, such as under-etching errors or over-etching errors, are identifiable by analyzing multiple diffraction orders, which can be accomplished with inexpensive and fast detectors, such as those that employ photodiodes. The speed and cost-effectiveness of such a diffraction analysis allows for efficient quality control during fabrication of meta-lenses, thereby being more amenable for mass production. Although embodiments with 100 mm f are disclosed, those having skill in the art will understand that similar operating principles are applicable to other embodiments with different focal lengths (e.g., 10 mm-diameter f/5 meta-lens, 10 mm-diameter f/2 meta-lens, etc.).

Continuing, FIG. 2A is a graph showing normalized intensity (unitless) at focal positions corresponding to different diffraction orders, as well as that of the zero-order transmission plotted as a function of percent linear phase error (%). Specifically, FIG. 2A represents the behavior of a system where a desired diffraction order is the first diffraction order and, thus, all non-first diffraction orders are undesired diffraction orders. With this in mind, FIG. 2A shows that a ±0% linear phase error (meaning, substantially no linear phase error) results in only a normalized first-order focal point (which appears at the designated focal position for lens operation), with all non-first diffraction orders (e.g., zero-order, second-order, third-order, fourth-order, etc.) being negligible when there is ±0% linear phase error. In other words, there are substantially no non-first order focal points and no zero-order transmissions when the linear phase error is substantially ±0%.

However, with more negative (−) linear phase error (moving toward the left of FIG. 2A) the zero-order transmission increases in intensity. Conversely, with more positive (+) linear phase error (moving toward the right of FIG. 2A), the second-order focusing increases in intensity. For reference, FIG. 2B shows the phase profile for ±0% linear phase error in FIG. 2A. FIG. 2C shows the phase profile for −50% (negative) linear phase error in FIG. 2A, which demonstrates that, as the linear phase error progresses beyond −50% (becoming more negative), the zero-order intensity becomes greater than the first-order intensity. FIG. 2D shows the phase profile for +50% (positive) linear phase error in FIG. 2A, which demonstrates that as the linear phase error progresses beyond +50% (becoming more positive), the second-order intensity becomes greater than the first-order intensity. Consequently, the degree of under-etching can be calculated by comparing the normalized intensity of the zero-order transmission with the normalized intensity at the first-order focal position. Similarly, the degree of over-etching can be calculated by comparing the normalized intensity at the second-order focal position with the normalized intensity at the first-order focal position.

In addition to calculating degrees of over-etching and under-etching, various phase properties provide information on fabrication or design errors that occur due to deviations in the diameter of nano-rods (or pillars). Those diameter-related errors are designated as "library shift errors," as they arise due to a shift in the sizes of the nanostructures from a library of nanostructures that span the desired size and wavelength range. FIG. 3A is a graph showing various polynomial fits, with phase error (rad) caused by an up to 16% library shift plotted as a function of pillar diameter (in micrometers (μm)) for one embodiment of a pillar library, while FIG. 3B is a graph showing corresponding values in another embodiment of a pillar library.

As shown in FIG. 3A, each family of curves represents a difference between new phase values and original phase values in a library of pillars when the pillar diameters are varied by a certain percentage from the original value. In particular, the embodiment of FIG. 3A shows the effect of varying pillar diameters for pillars with a height of 3.5 μm (H=3.5 μm) and a pitch of 1.5 μm (S=1.5 μm). As a shorthand, the H=3.5 μm, S=1.5 μm pillars are designated herein as "H=3.5 μm library." Solid lines represent exact differences, while different combinations of dotted and dashed lines represent polynomial approximations for various polynomial degrees or orders. As shown in FIG. 3A, a third-order polynomial provides a sufficiently accurate fit. A more-detailed view showing a portion of FIG. 3A is provided as an inset to FIG. 3A.

FIG. 3B shows the effect of phase errors (rad) as a function of pillar diameter (μm) for a H=3 μm library (again, with S=1.5 μm). Similar to the H=3.5 μm library, a third-order polynomial provides an accurate fit for the H=3 μm library, which implies that a similar family of curves can be obtained for most (if not all) nanostructure libraries. Those families of curves can be approximated with third-order polynomials. FIGS. 4A through 4D (collectively designated as FIG. 4), along with FIG. 2A, show differing impacts associated with different errors. Specifically, FIG. 4A shows the impact of library shift errors, with an enlarged view of the higher orders being shown in FIG. 4B. The impact of linear phase errors is shown in FIG. 2A, while the impact of quadratic phase errors and cubic phase errors are shown in FIG. 4C and FIG. 4D, respectively.

More-detailed analyses of the impact of quadratic phase errors are shown in FIG. 5, while more-detailed analyses of cubic phase errors are shown in FIG. 6. Specifically, FIG. 5 is a graph showing the impact of quadratic phase errors on the phase profile of a meta-lens with a H=3.5 μm library, with phase profile incorporating various amounts of input phase errors (rad) plotted as a function of aperture coordinate (mm); FIG. 6 is a graph showing the impact of cubic phase errors on the phase profile of a meta-lens (again, H=3.5 μm library), with phase profile incorporating various input phase errors (rad) plotted as a function of aperture coordinate (mm).

Demonstrated by the simulations shown in FIGS. 4 through 6 are several key observations.

First, the presence of phase distortions results in a shift of diffraction efficiency away from a designated diffraction order (e.g., first diffraction order in the examples described with reference to the embodiment of the meta-lens, above) and emergence of non-designated diffraction orders (such as zero-order transmission or second-order focal spots (again, as shown above)). The zero-order transmission or second-order focal spot reduces the intensity at the first-order focal position by diffracting some of the light away from the first-order focal position to a different position or direction (e.g., zero order transmission or second order focus). In other words, the first-order focal spot (expected at the first-order focal position) is not as bright because that light is being focused elsewhere. Thus, an emergence of one or more non-first-order focal spots provides an indication that there is a deviation from a desired (or ideal) phase profile. Also, a comparison of relative intensities at different focal positions provides both a qualitative as well as a quantitative measure of how far the actual phase profile deviates from the desired phase profile. Although the disclosed embodiment presumes that the first-order focal position is the desired focal position, it should be appreciated that the desired focal position may be other-order focal positions (e.g., second order, third order, etc.) or different combinations of various-order focal positions. Ultimately, deviations from a desired phase profile leads to an emergence of undesired-order focal spots or undesired-order transmissions.

Second, dependency of efficiency versus error varies for different diffraction orders and across various types of error. Consequently, different types of phase errors (e.g., linear, quadratic, cubic, etc.) provide different information with reference to the type of fabrication or design error.

Third, different types of phase errors, or various combinations of those different types of phase errors, are associated with different types of fabrication or design errors. For example, a linear phase error that results in a strong zero-order transmission represents an under-etching error, while a linear phase error that results in a strong second order focal spot represents an over-etching error. Additionally, if a zero-order transmission intensity is higher than the intensities from other orders (e.g., first order, second order, etc.), then that zero-order intensity is indicative of more than 50% under-etching. Likewise, if a second-order focal position intensity dominates, then the second-order intensity is indicative of more than 50% over-etching. Again, although the first-order focal position is presumed to be the desired focal position in the disclosed embodiments, it should be appreciated that the desired focal position may be other-order focal positions (e.g., second order, third order, etc.) or different combinations of various-order focal positions.

Fourth, different combinations of linear, quadratic, and cubic errors provide an indication of library shift errors. Consequently, quantifying the magnitude of these three types of errors provides qualitative and quantitative measures of library shift errors. Again, presuming that the first-order focal position is presumed to be the desired focal position, with reference to these different types of errors, if both the zero-order transmission intensity and the second-order focal spot intensity are greater than the first-order focal spot intensity (i.e., 0th >1st and 2nd >1st), then the cubic error will be at least 25% of the 271 value. Furthermore, if 2nd >0th >1st, then one can conclude that there is a negative cubic error greater than 25% of the 2π value. Conversely, if 0th >2nd >1st, then one can conclude that there is a positive cubic error greater than 25% of the 2π value. Comparable analyses can be extended to fabrication errors that are unique to a specific range of nanoelement dimensions or edge-to-edge separations, such as merging of the neighboring elements. Such imperfections will impose a nonlinear deformation on the phase profile which will be replicated at certain positions within each Fresnel zone. Identifying the contributions of linear and nonlinear phase errors in such distorted phase profiles will allow identification of the range of nanoelement sizes and separations causing the merging error or similar size-specific errors.

Of course, as those having skill in the art will appreciate, although measurements from a single cross-sectional slice is shown in the embodiments of FIGS. 1A through 6, a more accurate measure can be obtained by acquiring data from multiple slices or multiple different areas of a meta-lens or a meta-surface. For example, in some embodiments, the phase profile is measured at multiple positions around a focal position for of the focal order. The phase profile is measured for both wanted and unwanted focal orders. Also, the phase errors that are measured include both a positive phase error associated with its corresponding focal order and a negative phase error associated with the corresponding focal order, thereby permitting differentiation between positive phase errors and negative phase errors.

Ultimately, this disclosure shows that certain fabrication or design errors in meta-surfaces (e.g., meta-lenses, meta-gratings, etc.) are identifiable by analyzing intensity measurements, which can be accomplished with inexpensive and fast detectors, such as those that employ photodiodes. The speed and cost-effectiveness of such a diffraction analysis allows for efficient quality control during fabrication of meta-surfaces (e.g., meta-lenses, meta-gratings, etc.) thereby being more amenable to mass production.

Any process descriptions or blocks in flow charts should be understood as including alternative implementations, which may include the recited steps being executed out of order from that shown or discussed, including substantially concurrently or in reverse order, depending on the functionality involved, as would be understood by those reasonably skilled in the art of the present disclosure.

Although exemplary embodiments have been shown and described, it will be clear to those of ordinary skill in the art that a number of changes, modifications, or alterations to the disclosure as described may be made. For example, although preferred embodiments are explained with reference to meta-lenses, those having skill in the art will appreciate that similar principles of operation are applicable to a more general class of meta-surfaces that are designed to direct light into distinct diffraction orders during normal operation (e.g., meta-lenses, meta-gratings, etc.) All such changes, modifications, and alterations should therefore be seen as within the scope of the disclosure.

What is claimed is:

1. A process for identifying fabrication or design errors in meta-surfaces, the process comprising:

illuminating a meta-surface being evaluated with a light source to produce diffracted light comprising a desired-order diffraction profile and at least one undesired-order diffraction profile; and measuring, with at least one photodetector optically positioned to receive the diffracted light, a phase profile of the evaluated meta-surface, comprising:

measuring desired-order intensity values in the desired-order diffraction profile; and measuring undesired-order intensity values in the at least one undesired-order diffraction profile;

calculating a deviation of the measured phase profile from a desired phase profile; and correlating the calculated deviation with a fabrication error or design error of the evaluated meta-surface.

2. The process of claim 1, wherein measuring the undesired-order intensity values comprises at least one selected from the group consisting of:

measuring zero-order intensity values in a zero-order diffraction profile having a zero-order transmission; and measuring higher-order intensity values in a higher-order diffraction profile having a higher-order focal spot or within a higher diffraction order in an angular spectrum.

3. The process of claim 2, wherein measuring the higher-order diffraction profile comprises at least one selected from the group consisting of:

measuring second-order intensity values in a second-order diffraction profile having a second-order focal spot or within a second diffraction order in the angular spectrum;

measuring third-order intensity values in a third-order diffraction profile having a third-order focal spot or within a third diffraction order in the angular spectrum; and measuring fourth-order intensity values in a fourth-order diffraction profile having a fourth-order focal spot or within a fourth diffraction order in the angular spectrum.

4. The process of claim 3, wherein calculating the deviation of the measured phase profile from the desired phase profile comprises:

determining a normalized first-order intensity at the a first-order focal spot or within a first diffraction order in the angular spectrum;

determining a normalized zero-order intensity at the zero-order transmission;

comparing the normalized first-order intensity with the normalized zero-order intensity; and determining whether the normalized zero-order intensity is greater than the normalized first-order intensity.

5. The process of claim 4, wherein correlating the calculated deviation with the fabrication error comprises:

correlating the calculated deviation with an under-etching fabrication error in response to the normalized zero-order intensity being greater than the normalized first-order intensity.

6. The process of claim 3, wherein calculating the deviation of the measured phase profile from the desired phase profile comprises:

determining a normalized first-order intensity at a first-order focal spot or within a first diffraction order in the angular spectrum;

determining a normalized second-order intensity at the second-order focal spot or within the second diffraction order in the angular spectrum;

comparing the normalized first-order intensity with the normalized second-order intensity; and determining whether the normalized second-order intensity is greater than the normalized first-order intensity.

7. The process of claim 6, wherein correlating the calculated deviation with the fabrication error comprises:

correlating the calculated deviation with an over-etching fabrication error in response to the normalized second-order intensity being greater than the normalized first-order intensity.

8. The process of claim 3, wherein calculating the deviation of the measured phase profile from the desired phase profile comprises: determining a normalized first-order intensity at a first-order focal spot or within a first diffraction order in the angular spectrum; determining a normalized zero-order intensity at the zero-order transmission; determining a normalized second-order intensity at the second-order focal spot or within the second diffraction order in the angular spectrum; comparing the normalized first-order intensity with the normalized second-order intensity; comparing the normalized first-order intensity with the normalized zero-order intensity; comparing the normalized second-order intensity with the normalized zero-order intensity; determining whether the normalized second-order intensity is greater than the normalized first-order intensity (2nd >1st); determining whether the normalized zero-order intensity is greater than the normalized first-order intensity (0th >1st); and determining whether the normalized second-order intensity is greater than the normalized zero-order intensity (2nd >0th).

9. The process of claim 8, wherein correlating the calculated deviation with the fabrication error comprises:

calculating a linear error associated with the calculated deviation;

calculating a quadratic error associated with the calculated deviation; and calculating a cubic error associated with the calculated deviation.

10. The process of claim 9, wherein correlating the calculated deviation with the fabrication error comprises:

correlating a library shift error with a combination of:

the calculated linear error;

the calculated quadratic error; and the calculated cubic error.

11. The process of claim 10, wherein calculating the deviation further comprises:

determining that a cubic error of at least twenty-five percent (≥25%) exists when:

2nd >1st; and

0th >1st.

12. The process of claim 10, wherein calculating the deviation further comprises:

determining that a negative cubic error of at least twenty-five percent (≥25%) exists when 2nd >0th >1st.

13. The process of claim 10, wherein calculating the deviation further comprises:

determining that a positive cubic error of greater than twenty-five percent (≥25%) exists when 0th >2nd >1st.

14. The process of claim 1, wherein measuring the phase profile comprises measuring the phase profile of a whole area of the meta-surface.

15. The process of claim 1, wherein measuring the phase profile comprises measuring the phase profile of a sub-section of the meta-surface.

16. The process of claim 1, wherein measuring the phase profile comprises measuring the phase profile of a whole area of the meta-surface, thereby allowing for rasterized analysis of the phase profiles for the whole area.

17. The process of the claim 1, wherein measuring the phase profile comprises measuring the phase profile of a sub-section of the meta-surface, thereby allowing for rasterized analysis of the phase profiles for the sub-section.

18. The process of claim 1, wherein measuring the phase profile comprises measuring the phase profile at multiple positions around a focal position for each focal order.

19. The process of claim 18, wherein each focal order comprises:

a wanted focal order; and an unwanted focal order.

20. The process of claim 18, further comprising:

measuring a positive phase error associated with each focal order; and measuring a negative phase error associated with each focal order.

* * * * *